United States Patent [19]

Schilling

[11] Patent Number: 5,708,353
[45] Date of Patent: Jan. 13, 1998

[54] DEVICE FOR DETECTING THE SHORT CIRCUITING OF THE SWITCHES OF A CONVERTER CIRCUIT ARRANGEMENT

[75] Inventor: Robert Schilling, Niederrohrdorf, Switzerland

[73] Assignee: Asea Brown Boveri AG, Baden, Switzerland

[21] Appl. No.: 616,589

[22] Filed: Mar. 15, 1996

[30] Foreign Application Priority Data

Jun. 9, 1995 [DE] Germany ............ 195 21 108.1

[51] Int. Cl.[6] .................................................. G05F 5/04
[52] U.S. Cl. ........................................ 323/208; 323/908
[58] Field of Search ............................ 323/208, 209, 323/210, 908

[56] References Cited

U.S. PATENT DOCUMENTS

| | | | |
|---|---|---|---|
| 4,571,535 | 2/1986 | Gyugyi | 323/211 |
| 4,638,238 | 1/1987 | Gyugyi et al. | 323/211 |

FOREIGN PATENT DOCUMENTS

3601160 C2  10/1987  Germany.

*Primary Examiner*—Peter S. Wong
*Assistant Examiner*—Y. J. Han
*Attorney, Agent, or Firm*—Oblon, Spivak, McClelland, Maier & Neustadt, P.C.

[57] ABSTRACT

A device for detecting the short circuiting of the switches of a converter circuit arrangement is disclosed. The device is magnetically coupled to the current limiter coil and comprises a conductor loop which is preferably arranged at the end of the current limiter coil. On short circuiting, a voltage is induced in the conductor loop. This voltage is converted in a detection circuit into a voltage pulse and fed to an evaluation logic circuit. In the evaluation logic circuit, the period of the induced voltage pulse is evaluated and, if appropriate, load-relieval actuation is initiated.

13 Claims, 3 Drawing Sheets

EVALUATION LOGIC CIRCUIT

DEVICE FOR DETECTING THE SHORT CIRCUITING OF THE SWITCHES OF A CONVERTER CIRCUIT ARRANGEMENT

BACKGROUND OF THE INVENTION

1. Field of the Invention

The invention relates to the field of power electronics. It is based on a device, for detecting the short circuiting of the switches of a converter circuit arrangement, according to the preamble of the first claim.

2. Discussion of Background

Converter circuit arrangements for which the device according to the invention can be used generally comprise a DC voltage intermediate circuit or direct current intermediate circuit, to which a plurality of branches or phases with semiconductor switches are connected. The semiconductor switches of a branch form a load terminal and are alternately turned on and off in such a way that an AC voltage, for example of variable frequency, is produced on the load terminal. Because of a fault, for example a driving fault, it is possible for all the switches of a branch to short circuit and fail (consistent with the meaning of the German word "Durchzünden"). The result of this is a short-circuit discharge of the intermediate circuit across the switches, generally GTOs. An unacceptably heavy current is then produced, which can destroy the arrangement and, in particular, the GTOs as well. For this reason, it is necessary to register the triggering of a phase as reliably and as early as possible. If this is done, protective discharge can be induced, which relieves the load on the branch before failure occurs.

According to the prior art, the detection of the short circuiting event is ensured by monitoring the anode/cathode voltage. Since detection of the triggering is of fundamental importance for, the security of a converter system, the detection should, if possible, take place redundantly. In this case the two detection systems should be as far as possible electrically independent of each other.

SUMMARY OF THE INVENTION

Accordingly, one object of the invention is to provide a novel device for detecting the short circuiting of the switches of a converter circuit arrangement, which is electrically decoupled from the converter circuit arrangement and operates independently thereof.

In the case of a device of the type mentioned at the outset, this object is achieved by the features of the first claim.

The essence of the invention is thus that the device is magnetically coupled to the current limiter coil and comprises means for detecting a voltage which is induced in the current limiter inductor on short circuiting of the switches.

The detection means preferably comprise a conductor loop which is connected to a detection circuit. A particular advantage of this arrangement is that the induced voltage can simultaneously be used as the supply of the detection circuit. The conductor loop is most expediently arranged at the end of the current limiter coil. In order to screen the device from electric field influences, it is further possible to provide screening. Both the screening and the conductor loop are advantageously arranged on a printed-circuit board.

The detection circuit may, for example, comprise a threshold circuit which is connected to the conductor loop via a terminating resistor. For its part, the threshold circuit is connected to a constant current source which powers a photodiode that is optically coupled to an evaluation logic circuit.

Further illustrative embodiments are found in the corresponding dependent claims.

A particular advantage of the present invention is that the device can be operated electrically independently of the converter circuit arrangement. It can in this case be operated both as redundant short circuiting detection in conjunction, for example, with anode/cathode voltage monitoring, and also on its own.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
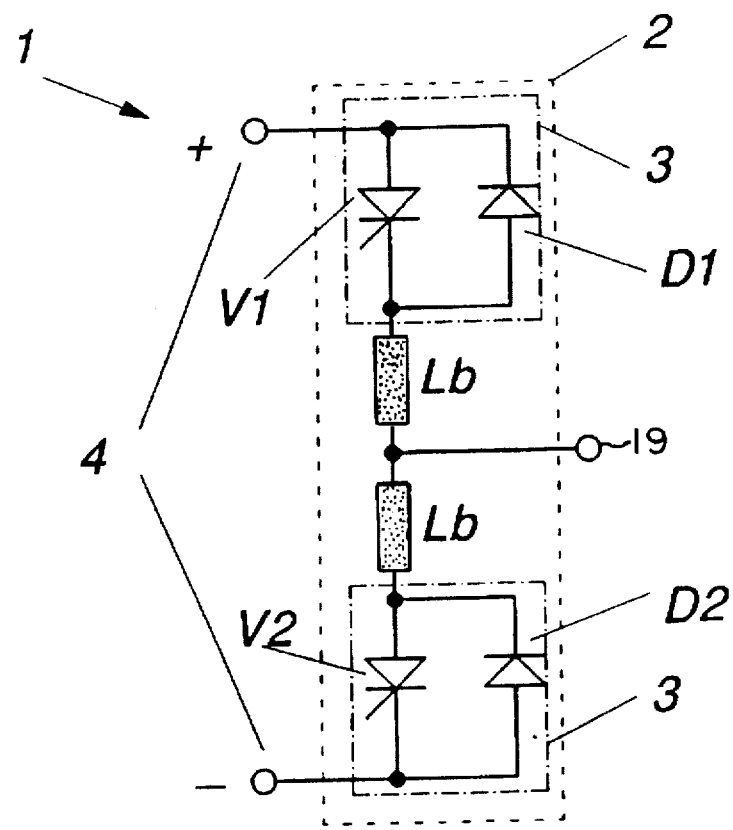
FIG. 1 shows a circuit diagram of a converter circuit arrangement for which the device according to the invention can be used.

Referring now to the drawings, wherein like reference numerals designate identical or corresponding parts throughout the several views, FIG. 1 shows a circuit diagram of a converter circuit arrangement 1 for which the invention can advantageously be used. The circuit arrangement comprises a DC voltage or direct current intermediate circuit 4 to which at least one branch or phase 2 is connected. Each branch 2 comprises a number of switches 3, two being represented, which in this illustrative embodiment each consist of a GTO V1 or V2 with an antiparallel-connected diode D1 and D2, respectively. The invention is not, however, necessarily restricted to GTOs with antiparallel diodes. At least one current limiter coil Lb is provided between the GTOs V1 and V2. The node between the two current limiter coils forms a load terminal 19 to which a load, for example a motor or another consumer, can be connected. The current-rise limiter coil need not necessarily comprise two coils, as represented, and a single coil with a center cap for the load terminal would also fulfil the required function. More generally, it is also possible to provide a larger number of phases or branches 2 which form a multiphase voltage system.

The mode of operation of the circuit arrangement represented in FIG. 1 is assumed to be known and is not explained in more detail here. In the case of such circuits, a fault may result in all of the switches 3 of a branch 2 being turned on simultaneously. This is termed a short circuiting failure (or "Durchzünden" in German) of the branch. The energy stored in the intermediate circuit 4 is then discharged in short-circuit fashion across the switches and can destroy them because of the excessively high current loading. In order to uncover this fault and remedy it by load-relieval actuation, it is important to register the short circuiting event reliably.

Figure 2:
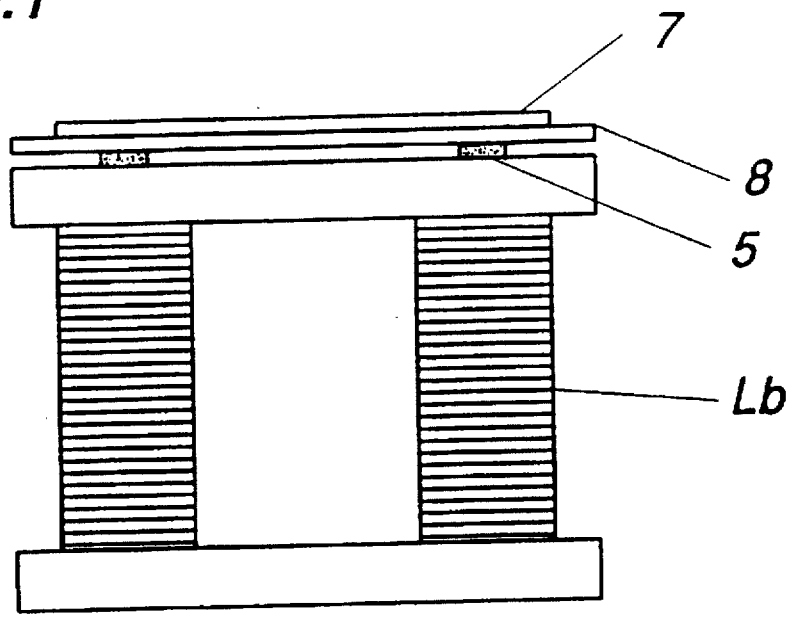
FIG. 2 shows a current-rise limiter coil with a device according to the invention fitted at the end.

The device according to the invention is optimally suited for this and comprises a conductor loop 5 which is preferably arranged at the end of the current limiter coil Lb (see FIG. 2). The conductor loop is magnetically coupled to the coil Lb with a mutual inductance M. Substantially the same flux passes through both of them. The short circuiting produces a current change, and therefore a flux change, in the coil Lb. According to Faraday's law of induction, this flux change induces a voltage in the conductor loop 5. This voltage can be detected in a detection circuit 6 connected to the loop 5 and can be evaluated in a downstream-connected evaluation circuit (not represented for the sake of clarity).

Figure 3:
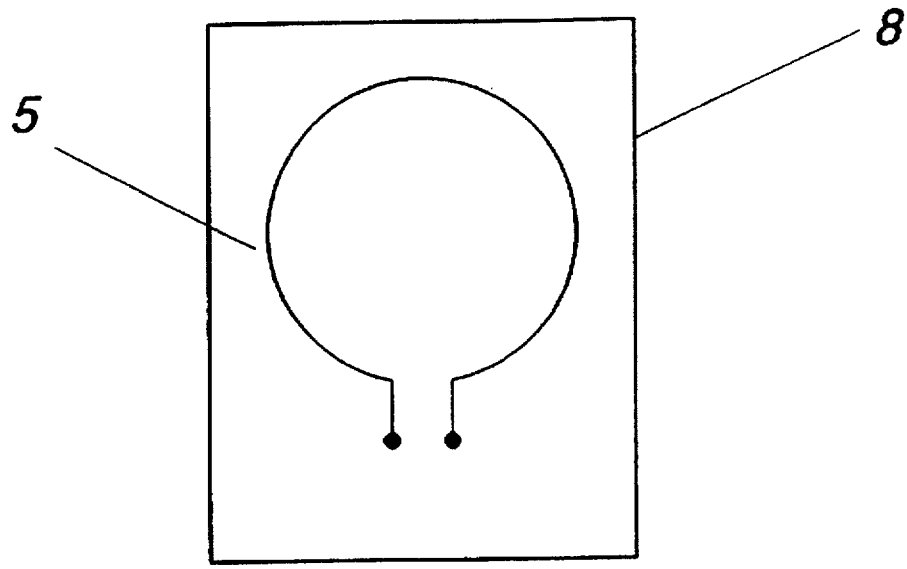
FIG. 3 shows a view of a printed-circuit board with the conductor loop according to the invention.

The induced voltage corresponds to the mutual inductance multiplied by the flux change. Thus, if the mutual inductance is as high as possible, a large voltage value is obtained. The mutual inductance is maximized by selecting the smallest possible distance between the coil Lb and the conductor loop 5. This is advantageously achieved by means of a thin printed-circuit board 8, for example made of plastic, onto which the conductor loop is fitted (FIG. 3).

Figure 4:
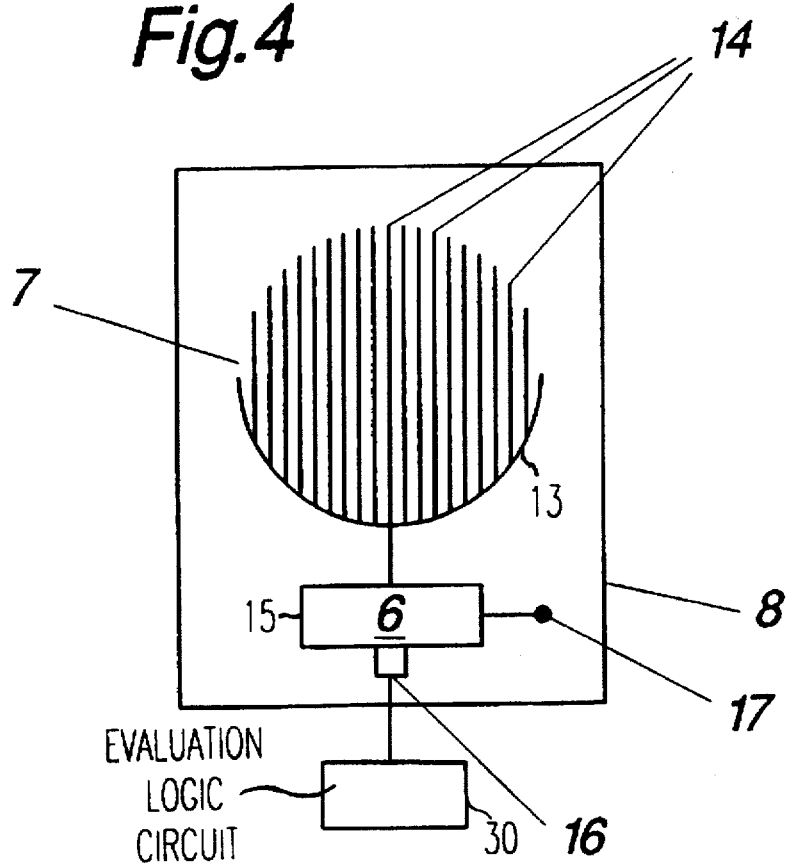
FIG. 4 shows the rear of the printed-circuit board represented in FIG. 3, with electrical screening.

In order to minimize the influence of interfering electric fields on the measurement, screening 7 may be fitted on the other side of the printed-circuit board 8. As represented in FIG. 4, this screening comprises a number of parallel conductive tracks 14 which are joined together by a main conductor 13. The circular arrangement represented is not necessarily required for the invention, but has advantages with regard to a correspondingly shaped conductor loop 5. However, the shape of the conductor loop 5 is also of no particular relevance. The screening also directly represents the reference potential for the detection circuit 6. To this end, the main conductor 13 is connected to the conductor loop 5 via a potential terminal 17. In order to protect the detection circuit 6 from interfering magnetic fields, it is installed in an electrically conductive housing 15. The circuit 6, with the housing 15, is advantageously also arranged on the printed-circuit board 8.

Figure 5:
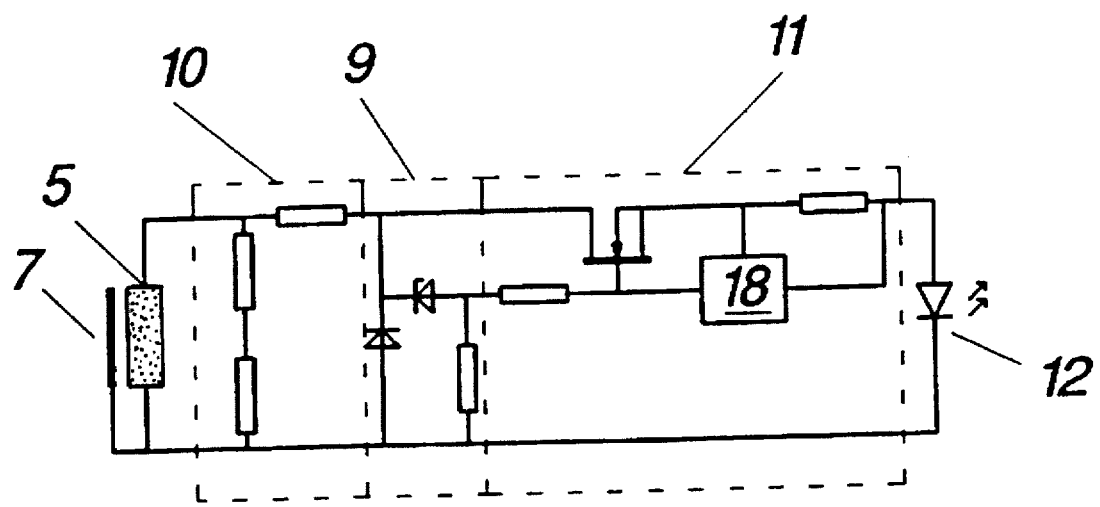
FIG. 5 shows a circuit diagram of a detection circuit which is suitable for the invention.

As represented in FIG. 5 by way of example, the detection circuit 6 comprises a terminating resistor 10, to which a threshold circuit 9 is connected. The threshold circuit 9 is required so that the detection circuit 6 does not respond during normal operation, in which flux changes in the coil Lb do actually occur, for example during switching. The terminating resistor 10 may, for example, be formed by a network of resistors, and the threshold circuit 9 by a network of resistors and a Zener diode. This threshold circuit 9 is connected to a constant current source 11 which drives a photodiode 12. The constant current source 11 is used in order that the photodiode 12 is always operated with the same current, independently of the amplitude of the induced voltage pulse. This permits a longer life of the photodiode 12. The constant current source may, for example, comprise a voltage controller 18 and a field-effect transistor. In order to evaluate the induced voltage, an evaluation logic circuit (30), which is optically coupled to the detection circuit 6 via the photodiode, is provided. To this end, an optical fiber terminal 16 (see FIG. 4) is provided.

The voltage induced in the conductor loop 5 is thus converted into a voltage pulse by the detection circuit 6. The length of the voltage pulse can be evaluated. In normal switching, a pulse with a duration of approximately 10 μs is produced. On the short circuiting event, this pulse lasts much longer (>50 μs). Thus, the duration of the voltage pulse produced is monitored in the evaluation logic circuit and, in the event of a pulse produced as a result of the short circuiting event, and therefore with relatively long duration, load-relieval actuation is initiated.

The repeatedly occuring switching pulse is advantageously used for monitoring functionality of the short circuiting detection. In this way, a very simple check can be carried out as to whether the short circuiting detection is ready for initiating possible load-relieval actuation.

The induced voltage is used for powering the detection circuit, so that a special voltage supply is not required. This allows the detection circuit to have a compact and simple structure.

The invention thus allows reliable detection, electrically isolated from the converter circuit arrangement, of the short circuiting of the switches. It can be used both on its own and as a redundant triggering detection system. The device according to the invention can be integrated with the current limiter coil in simple fashion and is very cost-effective to produce.

Obviously, numerous modifications and variations of the present invention are possible in the light of the above teachings. It is therefore to be understood that within the scope of the appended claims, the invention may be practised otherwise than as specifically described herein.

What is claimed as new and desired to be secured by Letters Patent of the United States is:

1. A device for detecting a short circuiting of at least one of a plurality of switches (3) of a converter circuit arrangement (1) having at least one branch (2) with the plurality of switches (3), said branch (2) being connected to at least one of a DC voltage intermediate circuit and a direct current intermediate circuit (4), respective of the plurality of switches (3) corresponding to said branch (2) being protected from excessively steep current edges by a current limiter coil (Lb) connected in series with respective of the switches (3), wherein the device being magnetically coupled to the current limiter coil (Lb), and wherein the device further comprises means (5, 6) for detecting a voltage induced in the current limiter coil (Lb) when a short circuit failure occurs in a respective one of the switches (3).

2. The device as claimed in claim 1, wherein the detection means (5, 6) comprises a conductor loop (5) which is connected to a detection circuit (6).

3. The device as claimed in claim 2, wherein the detection circuit (6) is powered by the induced voltage.

4. The device as claimed in claim 3, wherein the conductor loop (5) is arranged at the end of the current limiter coil (Lb).

5. The device as in one of claims 2–4, wherein the conductor loop (5) is arranged on a printed-circuit board (8).

6. The device of claim 5, further comprising means (7, 13, 14) for electrical screening the detection means, wherein said screening means (7, 13, 14) is arranged on the opposite side of the printed-circuit board (8) from the conductor loop (5).

7. The device of claim 6, wherein the screening means (7) comprises a multiplicity of parallel conductive tracks (14) connected via a main conductor (13), the main conductor (13) electrically forming a reference potential for the detection circuit (6).

8. The device of claim 5, wherein the detection circuit (6) comprises a threshold circuit, (9) which is connected to the conductor loop (5) via a terminating resistor (10), a downstream-connected constant current source (11) and a photodiode (12) powered by the constant current source (11), the photodiode (12) being optically coupled to an evaluation logic circuit.

9. The device as in one of claims 2–4, wherein the detection circuit (6) comprises a threshold circuit (9), which is connected to the conductor loop (5) via a terminating resistor (10), a downstream-connected constant current source (11) and a photodiode (12) powered by the constant current source (11), the photodiode (12) being optically coupled to an evaluation logic circuit.

10. The device of claim 9, further comprising means (7, 13, 14) for electrical screening the detection means, wherein said screening means (7, 13, 14) is arranged on the opposite side of the printed-circuit board (8) from the conductor loop (5).

11. The device as in one of claims 1-4, further comprising means (7, 13, 14) for electrical screening the detection means (5, 6), and wherein the detection means (5, 6) is arranged between the screening means (7, 13, 14) and the end of the current limiter coil (Lb).

12. The device of claim 11, wherein the conductor loop (5) is arranged on a printer-circuit board (8).

13. The device of claim 11, wherein the detection circuit (6) comprises a threshold circuit (9), which is connected to the conductor loop (5) via a terminating resistor (10), a downstream-connected constant current source (11) and a photodiode (12) powered by the constant current source (11), the photodiode (12) being optically coupled to an evaluation logic circuit.

* * * * *